(12) United States Patent
Al-Anezi et al.

(10) Patent No.: US 11,656,169 B2
(45) Date of Patent: May 23, 2023

(54) DEVELOPMENT OF CONTROL SAMPLES TO ENHANCE THE ACCURACY OF HIC TESTING

(71) Applicant: Saudi Arabian Oil Company, Dhahran (SA)

(72) Inventors: Mohammed Al-Anezi, Dhahran (SA); Khalid Ali Babakri, Dhahran (SA); Saad Al-Muaili, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 127 days.

(21) Appl. No.: 17/207,377

(22) Filed: Mar. 19, 2021

(65) Prior Publication Data
US 2022/0299425 A1   Sep. 22, 2022

(51) Int. Cl.
*G01N 17/02* (2006.01)
*G01N 17/00* (2006.01)
*E21B 47/117* (2012.01)

(52) U.S. Cl.
CPC ........... *G01N 17/02* (2013.01); *G01N 17/006* (2013.01); *E21B 47/117* (2020.05)

(58) Field of Classification Search
CPC .......................... C22C 33/0271; E21B 47/117
(Continued)

(56) References Cited

U.S. PATENT DOCUMENTS 4,153,454 A   5/1979 Emi et al.
4,245,698 A   1/1981 Berkowitz et al.
(Continued)

FOREIGN PATENT DOCUMENTS

CA   3043585 A1 *   5/2018   ............... B21B 1/22
CN   103484642 B   1/2015
(Continued)

OTHER PUBLICATIONS

Garett Angus, "Hydrogen Induced Damage in Pipeline Steels", Colorado, 2014, 101 pages.
(Continued)

*Primary Examiner* — Patrick Assouad
*Assistant Examiner* — Sean Curtis
(74) *Attorney, Agent, or Firm* — Bracewell LLP; Constance G. Rhebergen; Keith R. Derrington

(57) ABSTRACT

A test sample is extracted from a hydrogen induced cracking (HIC) resistant material candidate. A control sample is extracted from a prequalified HIC susceptible material that is known to suffer predetermined HIC damage when subjected to preset test conditions of a standardized HIC test (e.g., NACE TM0284). The HIC test is performed on the test and control samples. A value of a predetermined cracking criteria is calculated for the control sample. It is determined whether the calculated value of the predetermined cracking criteria is at least equal to a predetermined minimum threshold value. If yes, respective values of a plurality of predetermined HIC resistance criteria for the test sample are calculated. It is determined whether the calculated respective values of the plurality of predetermined HIC resistance criteria for the test sample are not greater than corresponding predetermined maximum threshold values. If yes, the HIC resistant material candidate is qualified as a valid source for sour service applications.

13 Claims, 4 Drawing Sheets

(58) Field of Classification Search
USPC .......................................................... 324/700
See application file for complete search history.

(56) References Cited

U.S. PATENT DOCUMENTS

| | | | |
|---|---|---|---|
| 4,942,922 A | 7/1990 | Redmerski et al. | |
| 5,555,916 A | 9/1996 | Kushida | |
| 5,556,594 A | 9/1996 | Frank et al. | |
| 5,728,943 A * | 3/1998 | Colter, Jr. | G01N 17/00 324/700 |
| 5,993,570 A * | 11/1999 | Gray | C22C 38/14 420/126 |
| 6,149,862 A | 11/2000 | Gliklad et al. | |
| 7,723,643 B2 | 5/2010 | Hackel et al. | |
| 8,002,910 B2 * | 8/2011 | Tivelli | C21D 9/08 148/590 |
| 8,262,767 B2 | 9/2012 | Numata et al. | |
| 8,356,857 B2 * | 1/2013 | Ralston | F16F 7/12 296/193.11 |
| 8,821,653 B2 | 9/2014 | Anelli et al. | |
| 9,222,871 B2 | 12/2015 | Roumeau et al. | |
| 9,540,717 B2 | 1/2017 | Nakata et al. | |
| 9,568,407 B2 * | 2/2017 | Pittam | G01N 3/48 |
| 9,644,248 B2 * | 5/2017 | Anelli | C21D 8/105 |
| 9,657,365 B2 * | 5/2017 | Anelli | C21D 9/08 |
| 9,931,715 B2 | 4/2018 | Kanasaki et al. | |
| 10,295,508 B2 * | 5/2019 | Traidia | G01N 29/04 |
| 10,421,545 B2 * | 9/2019 | Hess | G06F 1/16 |
| 10,458,960 B2 * | 10/2019 | Traidia | G01N 29/30 |
| 10,788,461 B2 * | 9/2020 | Mizuno | G01N 29/262 |
| 10,866,183 B2 * | 12/2020 | Sherik | G01N 17/04 |
| 11,235,427 B2 * | 2/2022 | Al-Muaili | B23K 31/12 |
| 2005/0061404 A1 | 3/2005 | Erike | |
| 2007/0089813 A1 * | 4/2007 | Tivelli | C22C 38/44 148/590 |
| 2009/0025839 A1 * | 1/2009 | Watanabe | C22C 38/12 148/330 |
| 2011/0100131 A1 | 5/2011 | Brown et al. | |
| 2011/0214932 A1 * | 9/2011 | Ralston | B60R 21/34 180/274 |
| 2014/0238145 A1 | 8/2014 | Tran et al. | |
| 2014/0299235 A1 * | 10/2014 | Anelli | C22C 38/42 148/504 |
| 2014/0299236 A1 * | 10/2014 | Anelli | C21D 9/08 148/504 |
| 2015/0307049 A1 * | 10/2015 | Kwon | B60R 21/04 188/377 |
| 2017/0191969 A1 * | 7/2017 | Traidia | G01N 29/04 |
| 2018/0186456 A1 * | 7/2018 | Hess | B64D 11/0624 |
| 2018/0217049 A1 * | 8/2018 | Sherik | G08B 21/182 |
| 2018/0340913 A1 * | 11/2018 | Mizuno | G01N 29/0672 |
| 2018/0364138 A1 | 12/2018 | Traidia et al. | |
| 2019/0024206 A1 * | 1/2019 | Kim | C22C 38/58 |
| 2019/0113482 A1 * | 4/2019 | Traidia | G01N 29/043 |
| 2020/0095649 A1 * | 3/2020 | Cha | C21C 7/072 |
| 2020/0377979 A1 | 3/2020 | De | |
| 2021/0054473 A1 * | 2/2021 | Pathak | C22C 38/02 |
| 2021/0229221 A1 * | 7/2021 | Al-Muaili | G01M 5/0033 |
| 2022/0010403 A1 * | 1/2022 | Kim | C22C 38/50 |
| 2022/0299424 A1 * | 9/2022 | Al-Muaili | G01N 3/20 |
| 2022/0299425 A1 * | 9/2022 | Al-Anezi | G01N 17/046 |

FOREIGN PATENT DOCUMENTS

| | | | |
|---|---|---|---|
| CN | 106248571 A | 12/2016 | |
| CN | 107991455 A | 5/2018 | |
| CN | 110333331 A | 10/2019 | |
| CN | 115404393 A * | 11/2022 | |
| EP | 0998591 B1 * | 3/2006 | C22C 38/001 |
| EP | 2520680 B1 | 10/2016 | |
| JP | 2712119 B2 | 10/1997 | |
| JP | 2006275591 A | 10/2006 | |
| JP | 2010236930 A | 10/2010 | |
| JP | 6048436 B2 | 12/2016 | |
| JP | 2017173100 A | 9/2017 | |
| RU | 2433189 C2 * | 11/2011 | C21C 7/0075 |
| WO | WO-2019180499 A1 * | 9/2019 | C21D 6/005 |
| WO | 2020120563 A | 6/2020 | |
| WO | WO-2020120563 A1 * | 6/2020 | C21D 1/18 |
| WO | WO-2021154635 A1 * | 8/2021 | B23K 31/12 |

OTHER PUBLICATIONS

Haase et al., "Fitness-for-Purpose HIC Testing of Heavy Wall Large Diameter Pipes for Midly Sour Applications in the New NACE TM0284-2016 Solution C", Corrosion, New Orleans, Louisiana, Mar. 2017, 5 pages.

Kim et al., "Effects of Microstructural Inhomogeneity on HIC Susceptibility and HIC Evaluation Methods for Linepipe Steels for Sour Service", ASME, Dec. 9, 2014, 6 pages.

Korda et al., "Hydrogen Induced Cracking of APIX52 and X60 Sour Service Steels Subjected to Pre-Strain Under Prolonged H2S Exposure", IOP Conference Series, 2019, 14 pages.

NACE TM0177-2016 Laboratory Testing of Metals for Resistance to Sulfide Stress Cracking and Stress Corrosion Cracking in H2S Environments, 2016, 77 pages.

NACE TM0284-2016 Evaluation of Pipeline and Pressure Vessel Steels for Resistance to Hydrogen-Induced Cracking, 2016, 36 pages.

Anonymous, "Standard Test Method, Evaluation of Pipeline and Pressure Vessel Steels for Resistance to Hydrogen-Induced Cracking", ANSI/NACE Standard TM0284-2003, Item No. 21215, 2003, 15 pages.

Anonymous, "Standard Test Method, Laboratory Testing of Metals for Resistance to Sulfide Stress Cracking and Stress Corrosion Cracking in H2S Environments", ANSI/NACE Standard TM0177-2005, Item No. 21212, 2005, 43 pages.

International Search Report and Written Opinion of the International Searching Authority issued in the prosecution of International Application No. PCT/US2021/014867, dated Apr. 6, 2021, 16 pages.

Saad Al-Muaili, "A370—18 Standard Test Methods and Definitions for Mechanical Testing of Steel Products", Feb. 20, 2019, 50 pages.

Saad Al-Muaili, "E290 Standard Test Methods for Bend Testing of Material for Ductility", Oct. 29, 2020, 10 pages.

* cited by examiner

DEVELOPMENT OF CONTROL SAMPLES TO ENHANCE THE ACCURACY OF HIC TESTING

TECHNICAL FIELD

Embodiments relate generally to steel alloys that exhibit excellent hydrogen induced cracking (HIC) resistance and that are suitable for use in sour service applications in the oil and gas industry. More specifically, the embodiments relate to developing and using HIC susceptible control samples that enhance the accuracy of HIC testing and validate the measured HIC resistance of the steel alloys for use in sour service applications.

BACKGROUND

Steel alloy materials used in oil and gas equipment for extraction, treatment, transportation and storage of low-quality crude (e.g., oil and gas containing wet hydrogen sulfide ($H_2S$); water and sour gas) are faced with the risk of sudden and severe cracking. That is, when the oil and gas equipment made of steel alloy is exposed to crude oil and gas containing water and $H_2S$, hydrogen atoms can originate from the anodic dissolution of the material and can diffuse into the steel and induce severe damage. Different forms of cracking may occur, such as HIC, sulfide stress cracking (SSC), stress oriented hydrogen induced cracking (SOHIC), and the like. These cracks can often be difficult to detect in routine inspections and are thus regarded as a higher risk for integrity loss than weight-loss corrosion. Environmental contamination caused by accidents in oil and gas equipment due to such cracking can be very problematic, and may require large restoration costs. To avoid such accidents, it is generally necessary to use steel alloys excellent in HIC resistance (e.g., HIC resistant steel, sour-resistant steel, and the like) for wet sour environment applications, like pipelines, plates, coils, flanges, vessels, and fittings that are used for extraction, treatment, transportation, and storage of crude containing water and $H_2S$.

HIC occurs according to the following principle. As a steel surface (e.g., in pipelines, plates, coils, flanges, vessels, and fittings) comes into contact with wet hydrogen sulfide contained in crude oil, corrosion occurs, and hydrogen atoms generated by the corrosion infiltrate and diffuse into steel to thereby be present in an atomic state in the steel. While the hydrogen atoms in the steel, as described above, are molecularized in the form of hydrogen gas, a gas pressure is generated, causing brittle cracks to occur in a weak structure in the steel (e.g., an inclusion, a segregation, an internal pore, or the like) due to the gas pressure, and when the cracks gradually grow to exceed endurable strength of a material, breakage occurs. Thus, when reacting with water, $H_2S$ can cause blistering failure, hydrogen embrittlement, HIC, SSC, and the like. Such failure may decrease the lifetime of the pipeline or other steel alloy equipment.

Thus, it is desirable to ensure HIC resistance of steel alloy materials that are to be used in wet sour applications containing hydrogen sulfide. A measure of successful HIC resistance of steel alloy materials to be used in wet sour applications is usually assessed through standardized corrosion tests such as ANSI/NACE TM0284-2016 ("NACE TM0284"), Evaluation of Pipeline and Pressure Vessel Steels for Resistance to Hydrogen-Induced Cracking. NACE TM0284 provides a standard set of test conditions for consistent evaluation of pipeline and pressure vessel steels and compares test results from different laboratories pertaining to the results of the absorption of hydrogen generated by corrosion of steel in wet $H_2S$. NACE TM0284 describes two test solutions, Solution A and Solution B, and includes special procedures for testing small-diameter, thin-wall, electric-resistance welded and seamless line pipe.

The test is intended to evaluate resistance to hydrogen-induced (stepwise) cracking. NACE TM0284 thus enables consistent and standardized evaluation of the steel's susceptibility to HIC in reproducible service conditions. The testing conditions (e.g., details of the test sample preparation, test solution, and other testing conditions or parameters) dictated by the standardized NACE TM0284 HIC test must be adhered to strictly in order to ensure that the results obtained from the HIC test are meaningful and accurate in assessing the HIC resistance of the tested steel alloy sample. If any (intentional or unintentional) deviation from the testing conditions occurs during the test, the obtained test results are no longer reliable in accurately assessing the HIC resistance of the tested steel alloy sample. Therefore, it is desirable to implement methods or techniques that can enhance, ensure, or otherwise guarantee the accuracy of the results obtained for a sample subsequent to standardized HIC testing.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method for performing a standardized HIC test on a HIC resistant material for a sour service application is provided. The method includes: obtaining an HIC resistant material candidate; extracting a test sample from the HIC resistant material candidate; extracting a control sample from a prequalified HIC susceptible material, the prequalified HIC susceptible material being known to suffer predetermined HIC damage when subjected to preset test conditions of a standardized HIC test; performing the standardized HIC test on the test sample and the control sample; calculating a value of a predetermined cracking criteria for the control sample subsequent to the standardized HIC test; determining whether the calculated value of the predetermined cracking criteria for the control sample is at least equal to a predetermined minimum threshold value; calculating respective values of a plurality of predetermined HIC resistance criteria for the test sample subsequent to the standardized HIC test, in response to determining that the calculated value of the predetermined cracking criteria for the control sample is at least equal to the predetermined minimum threshold value; determining whether the calculated respective values of the plurality of predetermined HIC resistance criteria for the test sample are not greater than corresponding predetermined maximum threshold values; and qualifying the HIC resistant material candidate as a valid source for sour service applications in response to determining that the calculated respective values of the plurality of predetermined HIC resistance criteria for the test sample are not greater than the corresponding predetermined maximum threshold values.

In another embodiment, the step of performing the standardized HIC test on the test sample and the control sample includes a step of placing the test sample and the control sample in the same HIC testing vessel to subject the test sample and the control sample to the preset test conditions of the standardized HIC test. For example, the standardized HIC test is a standardized NACE TM0284 corrosion test, and the test sample and the control sample are immersed in a corrosive test Solution A or a corrosive test Solution B, as defined by the NACE TM0284 corrosion test. The HIC resistant material candidate may be one of a hot rolled coil or plate of a carbon steel alloy composition having a particular Heat number, and a base metal of a welded pipe.

In yet another embodiment, the test sample is extracted from the HIC resistant material candidate such that a longitudinal direction of the test sample is aligned with a principal rolling direction of the HIC resistant material candidate, and the control sample is extracted from the prequalified HIC susceptible material such that a longitudinal direction of the control sample is aligned with a principal rolling direction of the prequalified HIC susceptible material.

In yet another embodiment, the method further includes: metallographically sectioning the control sample into a plurality of pieces subsequent to the standardized HIC test; analyzing one or more faces of one or more of the plurality of pieces of the control sample to calculate a Crack Length Ratio (CLR), where the calculated CLR is the value of the predetermined cracking criteria for the control sample calculated subsequent to the standardized HIC test; metallographically sectioning the test sample into a plurality of pieces subsequent to the standardized HIC test; and analyzing one or more faces of one or more of the plurality of pieces of the test sample to calculate a CLR, a Crack Sensitivity Ratio (CSR), and a Crack Thickness Ratio (CTR), where the calculated CLR, CSR, and CTR are the respective values of the plurality of predetermined HIC resistance criteria for the test sample calculated subsequent to the standardized HIC test.

In yet another embodiment, the predetermined minimum threshold value for the CLR of the control sample is preset at 20%, and where the predetermined maximum threshold values for the CLR, CSR, and CTR for the test sample are preset at 15%, 2%, and 5%, respectively, and the HIC resistant material candidate is qualified as the valid source for sour service applications in response to determining subsequent to the standardized HIC test that the calculated CLR for the control sample is at least 20%, while the calculated respective values of the CLR, CSR, and CTR for the test sample are not greater than 15%, 2%, and 5%, respectively. As another example, the predetermined maximum threshold values for the CLR, CSR, and CTR for the test sample are all preset at 0%, and the HIC resistant material candidate is qualified as the valid source for sour service applications in response to determining subsequent to the standardized HIC test that the calculated CLR for the control sample is at least 20%, while the calculated respective values of the CLR, CSR, and CTR for the test sample are all 0%.

In yet another embodiment, the step of qualifying the HIC resistant material candidate as the valid source for sour service applications includes a step of qualifying a Heat number corresponding to the HIC resistant material candidate as the valid source for sour service applications. In yet another embodiment, the method further includes, in response to determining that the calculated value of the predetermined cracking criteria for the control sample is less than the predetermined minimum threshold value: determining that results of the standardized HIC test on the test sample are invalid; obtaining a new test sample from the HIC resistant material candidate; obtaining a new control sample from the prequalified HIC susceptible material; and performing a new standardized HIC test on the new test sample and the new control sample.

In yet another embodiment, the method further includes: determining a Heat number corresponding to the HIC resistant material candidate as an invalid source for sour service applications in response to determining that the calculated respective value of at least one the plurality of predetermined HIC resistance criteria for the test sample is more than the corresponding predetermined maximum threshold value. In yet another embodiment, the step of extracting the control sample from the prequalified HIC susceptible material includes a step of cutting the control sample having predefined dimensions from a Heat number corresponding to the prequalified HIC susceptible material.

In yet another embodiment, a method for qualifying a HIC susceptible material candidate as a valid source for extracting control samples for use in HIC testing on HIC resistant material candidates is provided. The method includes: obtaining the HIC susceptible material candidate; extracting a plurality of specimens from the HIC susceptible material candidate; performing a standardized HIC test on each of the plurality of specimens; calculating a value of a predetermined cracking criteria for each of the plurality of specimens subsequent to the standardized HIC test; determining whether the calculated value of the predetermined cracking criteria for each of the plurality of specimens is at least equal to a predetermined minimum threshold value; and qualifying the HIC susceptible material candidate as a valid source for extracting control samples in response to determining that the calculated value of the predetermined cracking criteria for each of the plurality of specimens is at least equal to the predetermined minimum threshold value.

In yet another embodiment, the step of obtaining the HIC susceptible material candidate includes a step of obtaining a steel alloy composition including, in weight percent: Sulfur≥0.01%, Carbon 0.08%-0.20%, Manganese≥0.08%, and Copper≤0.02%, where the HIC susceptible material candidate is one of: (i) a hot rolled coil or plate of the steel alloy composition having a particular Heat number; and (ii) a base metal of a welded pipe. In yet another embodiment, the step of extracting the plurality of specimens includes a step of extracting at least three specimens from the HIC susceptible material candidate such that a longitudinal direction of each specimens is aligned with a principal rolling direction of the HIC susceptible material candidate. For example, the standardized HIC test is a standardized NACE TM0284 corrosion test, where, during the standardized HIC test, each of the plurality of specimens is immersed in a corrosive test Solution A or a corrosive test Solution B, as defined by the NACE TM0284 corrosion test.

In yet another embodiment, the step of calculating the value of the predetermined cracking criteria for each of the plurality of specimens includes, for each specimen: metallographically sectioning the specimen into a plurality of pieces subsequent to the standardized HIC test; and analyzing one or more faces of one or more of the plurality of pieces of the specimen to calculate a Crack Length Ratio (CLR) of the specimen, where the calculated CLR is the value of the predetermined cracking criteria for the specimen calculated subsequent to the standardized HIC test.

In yet another embodiment, the predetermined minimum threshold value for the CLR of each specimen is preset at 20%, and where the HIC susceptible material candidate is qualified as the valid source for extracting control samples in response to determining that the calculated CLR for each of the plurality of specimens is at least 20%. In yet another embodiment, the step of qualifying the HIC susceptible material candidate as the valid source for extracting control samples includes qualifying a Heat number corresponding to the HIC susceptible material candidate as the valid source for extracting control samples.

In yet another embodiment, a control sample is provided for verifying accuracy of test conditions during a standardized NACE TM0284 corrosion test on a test sample being qualified for use in sour service applications. The control sample is extracted from a steel alloy composition including, in weight percent: sulfur≥0.01%, carbon 0.08%-0.20%, manganese≥0.08%, and copper≤0.02%. The control sample is adapted for being placed in the same HIC testing vessel as the test sample of an HIC resistant material candidate undergoing the standardized NACE TM0284 corrosion test for qualifying the HIC resistant material candidate as a valid source for use in sour service applications. The control sample produces a Crack Length Ratio (CLR) of at least 20% when immersed in a corrosive test Solution A or a corrosive test Solution B of the standardized NACE TM0284 corrosion test, and when the control sample and the test sample are subject to the standardized test conditions as defined by the standardized NACE TM0284 corrosion test.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
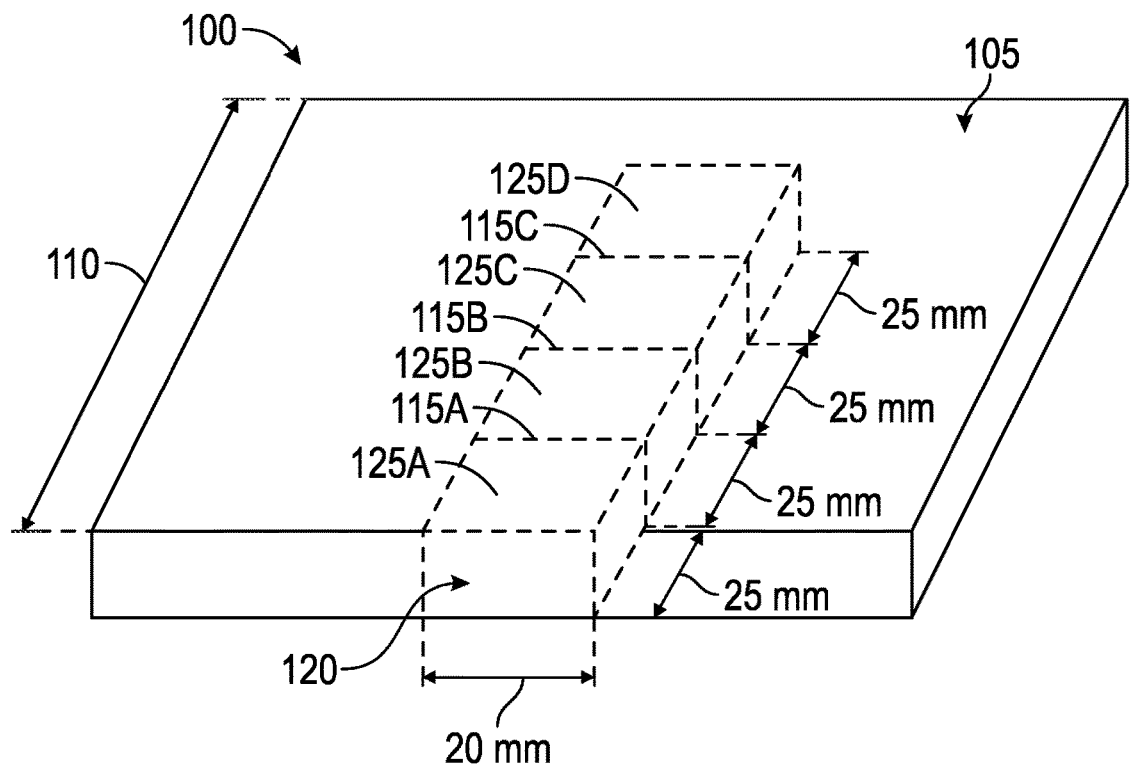
FIG. 1 is a schematic diagram illustrating the orientation and faces to be examined of a sample undergoing standardized HIC testing, in accordance with one or more embodiments.

While certain embodiments will be described in connection with the illustrative embodiments shown herein, the subject matter of the present disclosure is not limited to those embodiments. On the contrary, all alternatives, modifications, and equivalents are included within the spirit and scope of the disclosed subject matter as defined by the claims. In the drawings, which are not to scale, the same reference numerals are used throughout the description and in the drawing figures for components and elements having the same structure.

DETAILED DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the disclosed subject matter, and multiple references to "one embodiment" or "an embodiment" or "another embodiment" should not be understood as necessarily all referring to the same embodiment.

This disclosure pertains to developing and using HIC susceptible control samples (e.g., control specimens, control coupons, and the like) to ensure the accuracy of HIC test results for test samples (e.g., test specimens, test coupons, and the like) of a HIC resistant material candidate that is being tested for HIC compliance for use in sour service applications. The HIC test is performed under applicable international standards (e.g., NACE TM0284 standard). The use of qualified control samples ensures accuracy of the HIC test results for potential HIC resistant materials and minimizes the chances of the HIC resistant material that is being tested for HIC from being falsely being identified as acceptable for use in sour service applications.

Techniques disclosed herein look to develop predetermined cracking criteria (e.g., CLR) and identify a predetermined minimum threshold value (e.g., percentage value) for the cracking criteria (e.g., CLR≥20% subsequent to HIC testing) for the HIC susceptible material that is developed for use in ensuring HIC testing accuracy for HIC resistant materials undergoing HIC testing. Techniques disclosed herein further look to develop (e.g., manufacture, select, and the like) the HIC susceptible material that will consistently meet or exceed the identified predetermined minimum threshold value for the predetermined cracking criteria during HIC testing, by controlling the chemical composition of identified elements (e.g., Sulfur, Carbon, Manganese, and Copper) of the HIC susceptible material. In one embodiment, the HIC susceptible material (and control sample extracted therefrom) is determined to include sulfur≥0.01%, carbon≥0.08% (and preferably, between 0.08% and 0.20%), manganese≥0.08%, and copper≤0.02%. The HIC susceptible material from which control samples may be extracted may be a hot rolled coil or plate (e.g., selected or manufactured hot rolled coil or plate having a specific Heat number), or a base metal of welded pipes.

The method for qualifying a developed HIC susceptible material candidate (e.g., hot rolled coil of HIC susceptible material having a specific Heat number, base metal of welded pipes) which has a specific chemical composition of elements like sulfur, carbon, manganese, and copper, as an acceptable source of obtaining control samples for HIC testing may include steps including: obtaining or extracting a plurality of samples (e.g., three samples) from the same source of HIC susceptible material candidate (e.g., from the same Heat number of HIC susceptible material candidate, same base metal source, and the like), testing the plurality of samples for HIC under the NACE TM0284 standard, determining whether each of the plurality of samples has met the predetermined minimum threshold value for the predetermined cracking criteria (e.g., CLR≥20%) subsequent to the HIC testing, and qualifying or validating the developed HIC susceptible material candidate as an acceptable source for obtaining control samples in response to determining that each of the plurality of samples has met the predetermined minimum threshold value. After the HIC susceptible material (e.g., particular Heat number of HIC susceptible material, particular welded pipe base metal source, and the like) has been qualified for obtaining or extracting control samples, techniques disclosed herein look to subsequently extract control samples from the qualified HIC susceptible material to validate HIC testing results for each of one or more HIC resistant material candidates that are undergoing HIC testing for validation for use in sour service applications.

The method for validating HIC testing results for HIC resistant material candidates (e.g., hot rolled coil or plate of HIC resistant material candidate having a specific Heat number) developed for use in sour service applications includes multiple steps including: developing predetermined HIC resistant material (e.g., manufacturing or selecting a specific hot rolled coil or plate having a specific Heat number and a specific chemical composition of elements, selecting a base metal of a welded pipe material whose HIC resistance is to be analyzed) by controlling the chemical composition of elements of the HIC resistant material candidate to have adequate HIC resistance for sour service, obtaining or extracting a test sample from the HIC resistant material candidate (e.g., from the specific Heat number of the HIC resistant material candidate) for HIC testing according to the NACE TM0284 standard, obtaining or extracting a qualified control sample from the qualified HIC susceptible material (e.g., from a qualified or validated Heat number of HIC susceptible material), placing the extracted control sample and the extracted test sample in the same HIC testing vessel so that both the control sample and the test sample are subjected to the same set of standardized HIC testing conditions (e.g., test solution, test duration, and the like) in the testing vessel, determining whether the control sample has met the predetermined minimum threshold value for the predetermined cracking criteria subsequent to the HIC testing (e.g., CLR≥20%), and determining the HIC test results for the test sample to be valid in response to determining that the control sample has met the predetermined minimum threshold value.

The method for validating HIC testing results for the HIC resistant material candidate further includes: in response to determining that the HIC test results for the test sample are accurate or valid, determining whether the test sample has met predetermined maximum threshold values (e.g., percentage values) for respective predetermined HIC resistance criteria (e.g., for the test sample, the crack sensitivity ratio (CSR)≤2%, crack length ratio (CLR)≤15%, and crack thickness ratio (CTR)≤5%) subsequent to the HIC testing, and in response to determining that the test sample has met the predetermined maximum threshold values for the respective predetermined HIC resistance criteria subsequent to the HIC testing, qualifying the source from which the test sample was extracted (e.g., the specific Heat number of the HIC resistant material candidate from which the test sample was extracted) as a valid source of HIC resistant material for wet sour environment applications like pipelines, plates, coils, flanges, vessels, and fittings that are used for extraction, treatment, transportation and storage of crude containing water and $H_2S$.

On the other hand, in response to determining that the control sample has not met the predetermined minimum threshold value (e.g., percentage value) for the predetermined cracking criteria subsequent to the HIC testing (e.g., for the control sample, CLR<20%), the HIC test results for the test sample are determined to be invalid, and the standardized HIC test is conducted again with a new qualified control sample and a test sample of the HIC resistant material candidate in the same HIC testing vessel. Further, in response to determining that the test sample has not met the predetermined maximum threshold values (e.g., percentage values) for the respective predetermined HIC resistance criteria subsequent to the HIC testing (e.g., for the control sample, CLR≥20%; and for the test sample, CSR>2%, CLR>15%, or CTR>5%), the source from which the test sample was extracted is determined to be an invalid source of HIC resistant material for wet sour environment applications, and a new source of HIC resistant material (e.g., select new HIC resistant material candidate have a new Heat number and having a different specific chemical element composition) is obtained or developed for HIC testing. This disclosure thus provides a practical method to ensure the accuracy of HIC testing and minimize the chance of accepting substandard HIC resistant materials for use in the wet sour field.

ANSI/NACE TM0284-2016, Evaluation of Pipeline and Pressure Vessel Steels for Resistance to Hydrogen-Induced Cracking (HIC): HIC is a stepwise cracking that occurs in carbon steel in an $H_2S$-containing water environment due to absorption of atomic hydrogen. The extension of this type of cracking parallel to the rolling direction of steel coil or plate forms stepwise cracking. HIC propagates through a trap site in the material such as inclusion/matrix interfaces and does not require any external stress. A measure of successful HIC resistance of equipment used in sour service applications (e.g., pipelines, plates, coils, flanges, vessels, and fittings that are used for extraction, treatment, transportation and storage) is usually assessed through standardized corrosion tests such as NACE TM0284 on plate samples which evaluate the steel's susceptibility to HIC in reproducible service conditions. Details of test sample preparation, test solution and testing are described below.

FIG. 1 shows schematic diagram 100 illustrating the orientation and faces to be examined of a sample 120 undergoing HIC testing, in accordance with one or more embodiments. As shown in FIG. 1, a full thickness (≤30 mm) sample (e.g., control sample, test sample) 120 of 100±1 mm long and 20±1 mm wide with longitudinal axis aligned with the principal rolling direction 110 of the material 105 (e.g., hot rolled coil or plate of HIC susceptible material having a specific Heat number from which control sample(s) are extracted, hot rolled coil or plate of HIC resistant material candidate having a specific Heat number from which test samples are extracted, and the like) is cut (e.g.., extracted, obtained) from the source material plate (or coil) 105. For plates 105 thicker than 30 mm, overlapping samples are taken till the whole thickness is covered in order to ensure central region of the plate is represented.

The HIC test is conducted based on predefined solutions, pH level, and H₂S concentration specified in NACE TM0284 (e.g., test conditions). NACE TM0284 describes two test solutions, Solution A and Solution B. In NACE TM0284 HIC testing, test specimens are usually exposed to a sour solution containing H₂S at a pressure of 1 bar for 96 hours. H₂S purity of 99.5% is used in testing. In NACE TM0284 Solution A, sodium chloride (NaCl) and acetic acid (CH₃COOH) are dissolved in distilled or deionized water saturated with H₂S gas at ambient temperature and pressure. In NACE TM0284 solution B, synthetic seawater solution is saturated with H₂S at ambient temperature and pressure. The reagents for Test Solution A are nitrogen gas for purging, H₂S gas, NaCl, CH₃COOH, and distilled or deionized water. The reagents for Test Solution B are nitrogen gas for purging, H₂S gas, and synthetic seawater. In case of HIC testing under NACE TM0284 Solution A, the pH at the start of the test shall be measured immediately after H₂S saturation and shall be within the range of 2.7 to 3.3. In case of HIC testing under NACE TM0284 Solution B, the pH shall be measured immediately after H₂S saturation and shall be within the range of 4.8 to 5.4. At the end of the HIC test, the pH for Solution A shall not exceed 4.0 for the test to be valid, and the pH shall be within the range of 4.8 to 5.4 for the test to be valid. The temperature of the test solution (A or B) during contact with the sample (e.g., control specimen, test specimen) shall be 25±3° C. (77±5° F.). Each sample shall be 100±1 mm (4.00±0.04 in) long by 20±1 mm (0.80±0.04 in) wide. Above specifications for NACE TM0284 Solution A or B are generally referred to here as test conditions.

In case of HIC testing under NACE TM0284 Solution A, the samples for HIC testing (e.g., control sample, test sample) are immersed in a sealed vessel containing 5% NaCl and 0.5% acetic acid in distilled water and purged with H₂S gas resulting in a pH of 3. After 96 hrs of exposure to the corrosive test solution termed Solution A, sample 120 is subject to metallographic sectioning along the dashed-lines at 115A, 115B, and 115C for analysis as shown in FIG. 1.

FIG. 1 shows the manner in which the sample pieces 125A, 125B, 125C, and 125D (e.g., control sample pieces, test sample pieces) are sectioned for metallographic evaluation for any cracks generated. Reference numerals 115A, 115B and 115C indicate the faces of the sample pieces 125A, 125B, 125C, and 125D to be examined/tested for cracks. Solution A offers the most severe corrosive atmosphere and the test itself is very rigorous in evaluating HIC resistance. A measure of successful HIC resistance is interpreted based on acceptable maximum threshold values (e.g., percentage values) for predetermined HIC resistance criteria (e.g., CLR, CSR and CTR) using crack dimensions as indicated in FIG. 2.

Figure 2:
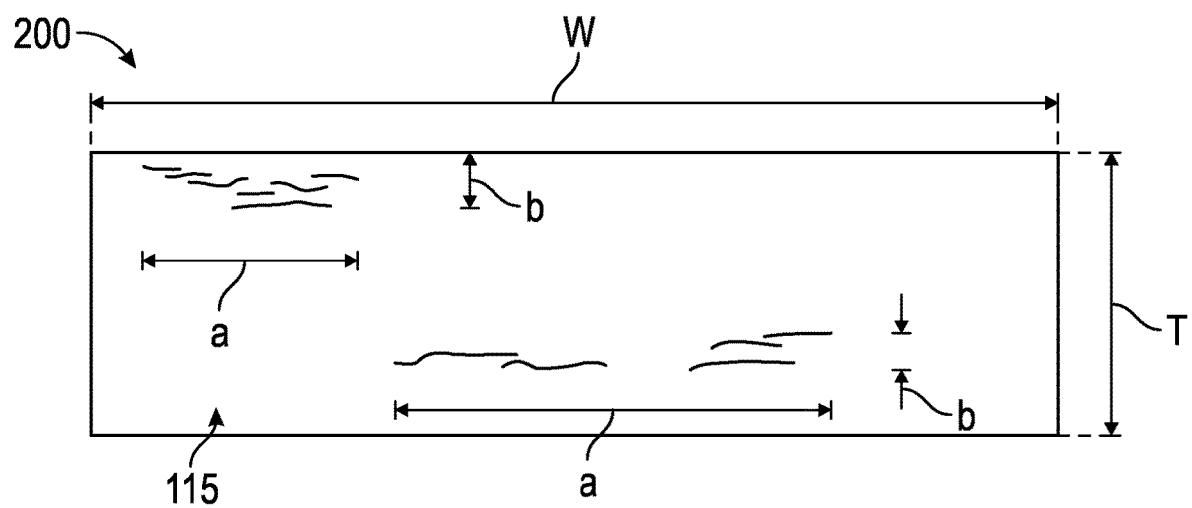
FIG. 2 depicts the face of each piece to be analyzed and describes the variables used to calculate CLR, Crack Sensitivity Ratio (CSR) and Crack Thickness Ratio (CTR) in standardized HIC testing, in accordance with one or more embodiments.

FIG. 2 depicts cross-sectional view 200 of face 115 (e.g., face at 115A, 115B, or 115C in FIG. 1) of a piece (e.g., one of sample pieces 125A, 125B, 125C, and 125D in FIG. 1) to be analyzed to calculate CLR, CSR and CTR percentage values. Equations used to calculate CLR, CSR and CTR are as follows.

$$CSR = \frac{\sum(a \times b)}{(W \times T)} \times 100\%$$

$$CLR = \frac{\sum a}{W} \times 100\%$$

$$CTR = \frac{\sum b}{T} \times 100\%$$

As shown in FIG. 2, the face (e.g., face at 115A, 115B, or 115C in FIG. 1) of the piece (e.g., 125A, 125B, 125C, or 125D in FIG. 1) to be analyzed has a width W and a thickness T. The CLR is defined as the sum of the width dimensions of all cracked sections "a" (i.e., Σa) divided by the face width W and multiplied by 100 to result in a percentage. The CSR is sum of the width dimensions of each cracked section "a" times the thickness of that section "b" for all cracked sections (i.e., Σ(a×b)), which sum is then divided by the product of the face width W and the face thickness T (i.e., W×T) and again multiplied by 100 to result in a percentage. Finally, the CTR is defined as the sum of the thickness dimensions of all cracked sections "b" (i.e., a) divided by the face thickness T and multiplied by 100 to result in a percentage.

Thus, after completion of HIC testing, the CLR, CTR, and CSR are calculated for each metallographic section of the sample (e.g., test sample of HIC resistant material candidate, or control sample of HIC susceptible material) to determine whether the calculated percentage values (or averaged values) meet predetermined standards. American Petroleum Institute (API) and International standards stipulate CLR, CTR and CSR values of ≤15%, ≤5% and ≤2%, respectively for HIC resistant linepipe grades (e.g., predetermined maximum threshold values for the respective predetermined HIC resistance criteria subsequent to the HIC testing for test sample of HIC resistant material candidate). Final CLR, CTR, and CSR percentage values for sample 120 may be calculated based on CLR, CTR, and CSR values for one or more of the faces (e.g., 115A, 115B, and 115C in FIG. 1) of one or more of the pieces (e.g., 125A, 125B, 125C, and 125D in FIG. 1) of sample 120.

As mentioned previously, the HIC test as per the NACE TM0284 standard is used to qualify HIC resistant material candidate (e.g., hot rolled coil or plates of carbon steel having a specific Heat number) to be used in wet sour applications containing hydrogen sulfide (H₂S) where HIC resistance is required. When conducting the HIC test as per the NACE TM0284 standard, use of incorrect test solution preparation or pH measurement (or other inconsistencies that constitute a departure from the test conditions dictated by the NACE TM0284 standard) can have a major detrimental effect on the test results conducted in H₂S containing solutions, and render the HIC results to be inaccurate. That is, testing using contaminated or improper solutions could lead to inaccurate results for the test sample of the HIC resistant material candidate being tested, and as a result, may cause approval of substandard HIC resistant materials (e.g., false positives) as adequately resistant to HIC, when they are in fact not adequately HIC resistant. Use of such false positives in the field could lead to catastrophic consequences.

In order to overcome the above problem, the present disclosure proposes developing and using a control sample of known HIC susceptible material in HIC testing under applicable international standards to ensure the accuracy of HIC testing results and minimize the chance of qualifying a test sample as meeting predetermined standards of acceptability for use as a qualified HIC resistant material, when the test sample does not in fact meet such predetermined standards. Thus, use of a qualified control sample extracted from known HIC susceptible material during HIC testing ensures validation of the entire qualification and testing processes, thereby guaranteeing close conformity during the HIC testing with testing conditions and protocols dictated by the applicable international standards (e.g., NACE TM0284).

Inventors of the present disclosure have conducted experiments to test and develop HIC susceptible materials having known susceptibility to HIC damage, and identified predetermined cracking criteria (e.g., Crack Length Ratio (CLR)) and a predetermined minimum threshold value for the cracking criteria (e.g., CLR≥20% subsequent to HIC testing) such that the developed HIC susceptible material meeting this criteria under predetermined standardized HIC testing conditions (e.g., test conditions dictated by NACE TM0284) ensures or guarantees the accuracy of the HIC testing for HIC resistant material candidates being tested for HIC. Thus, once the developed HIC susceptible material has been validated as a qualified source for obtaining control samples, a qualified control sample may then be extracted from the HIC susceptible material (e.g., non-HIC resistant material, non-wet sour material) and used during HIC testing under the same predetermined standardized conditions (e.g., test conditions dictated by NACE TM0284) for a test sample extracted from a HIC resistant material candidate undergoing testing for being qualified for sour service use. During the HIC testing of the test sample, the qualified control sample may be placed in the same HIC testing vessel as the test sample of the HIC resistant material candidate undergoing testing for HIC and subject to the same test conditions.

The test result for the test sample may then be considered to be valid if the control sample experienced predetermined HIC damage as evidenced from the control sample meeting or exceeding the identified predetermined minimum threshold value for the predetermined cracking criteria (e.g., CLR≥20% subsequent to HIC testing). Use of the control sample made from non-HIC resistant or HIC susceptible material during HIC testing thus ensures accuracy of HIC testing, and resultant use of HIC resistant steel for manufacture of equipment and pipes for critical sour service applications, thereby avoiding catastrophic failures which could potentially lead to fatalities and loss of assets.

The international standards (e.g., the NACE TM0284) for HIC testing do not require use of a control sample made from non-HIC resistant (HIC susceptible) material during HIC testing in order to validate the test results. That is, the international standards do not mandate using control samples during HIC testing and no procedure has been established to qualify whether a particular material can be used for making control samples for HIC testing or what criteria, as gleaned from the control sample after the HIC test, constitutes a "successful" HIC test carried out under accurate test conditions. Inventors of the present disclosure have conducted numerous experiments to develop this criteria gleaned from control samples, and also develop HIC susceptible materials that will consistently meet this criterial under known and standardized testing conditions.

In particular, Inventors of the present disclosure have conducted numerous experiments to develop the predetermined cracking criteria and identify the predetermined minimum threshold value (e.g., percentage value) for the predetermined cracking criteria for non-HIC resistant (or HIC susceptible) materials from which control samples are to be obtained. The criteria and threshold value were developed and identified based on repeated testing of control samples in HIC solutions by the Inventors. The Inventors further developed and selected the HIC susceptible materials that will consistently produce the predetermined minimum threshold value for the predetermined cracking criteria when subject to standardized HIC testing conditions. In particular, the Inventors confirmed based on repeated testing and cracking analyses that at CLR<20% for the control sample, the HIC testing accuracy is dubious, and therefore, the HIC testing should be repeated. Without the use of control samples, it is impossible to ensure generation of adequate hydrogen atom concentration in the test solution during HIC testing so as to ensure that the HIC resistant steel being qualified for wet sour applications is in fact HIC resistant to a sufficient degree. Use of control samples thus avoids the occurrence of catastrophic failures.

That is, Inventors of the present disclosure have identified a predetermined minimum threshold value (e.g., percentage value) for predetermined cracking criteria that when satisfied by a HIC susceptible material candidate, qualifies the candidate as a HIC susceptible material that is a valid source for extracting control samples. Inventors have further developed the appropriate HIC susceptible materials (e.g., alloy composition) that will consistently meet or exceed the predetermined minimum threshold value for the predetermined cracking criteria (e.g., control sample developing CLR≥20% subsequent to HIC testing) when subject to standardized testing conditions.

Inventors of the present disclosure have conducted experiments to determine the proper HIC susceptible materials that will consistently produce the cracking criteria under the standardized test conditions. The chemistry of the material is important to obtain a suitable HIC susceptible material and resultant control sample for HIC testing. Based on experiments, Inventors of the present disclosure have determined that to develop HIC susceptible material that will repeatedly and consistently develop predetermined HIC damage (e.g., CLR≥20% subsequent to HIC testing) under standardized conditions, chemical composition of elements including Sulfur, Carbon, Manganese, & Copper shall be controlled. More specifically, Inventors of the present disclosure have determined the following: sulfur≥0.01%. Sulfur content from 0.003-0.010% will result in variation of the average CLR (e.g., the cracking criteria). Less than 0.002% sulfur will make the material extremely resistant to HIC and the required identified minimum threshold value for the cracking criteria (e.g., 20% CLR) will not be reproducible even with higher content of carbon and manganese. Carbon≥0.08% (and preferably, between 0.08% to 0.20%) and manganese≥0.08%. Copper≤0.02%. Copper content higher than 0.02% reduces the absorption of hydrogen by forming a Cu-rich layer at the surface of the steel and increases the variation in percentage of CLR of the control sample. Table 1 illustrates inventive examples of chemical compositions of HIC susceptible materials identified by the Inventors as qualified for extracting control samples for standardized HIC testing. The inventive examples in Table 1 of HIC susceptible materials have been qualified based on the material meeting or exceeding the identified minimum threshold value for the cracking criteria (e.g., CLR≥20%).

TABLE 1

| Classification | Test No. | Alloy Composition % by weight | | | | | | | | | | | | | | CLR |
|---|---|---|---|---|---|---|---|---|---|---|---|---|---|---|---|---|
| | | C | Mn | P | S | Cr | Mo | Ni | Al | B | Cu | Nb | Ti | V | Ca | |
| Inventive Examples | 1 | 0.12 | 1.1 | 0.09 | 0.017 | 0.023 | <0.01 | 0.01 | 0.034 | <0.0005 | 0.01 | <0.01 | <0.01 | <0.01 | <0.02 | 43 |
| | 2 | 0.11 | 1.1 | 0.08 | 0.018 | 0.025 | <0.01 | 0.02 | 0.035 | <0.0005 | 0.015 | <0.01 | <0.01 | <0.01 | <0.02 | 40 |
| | 3 | 0.12 | 0.92 | 0.08 | 0.02 | 0.025 | <0.01 | 0.02 | 0.031 | <0.0005 | 0.01 | <0.01 | <0.01 | <0.01 | <0.02 | 37 |
| | 4 | 0.9 | 1.2 | 0.09 | 0.02 | 0.024 | <0.01 | 0.02 | 0.031 | <0.0005 | 0.01 | <0.01 | <0.01 | <0.01 | <0.02 | 35 |

Figure 3:
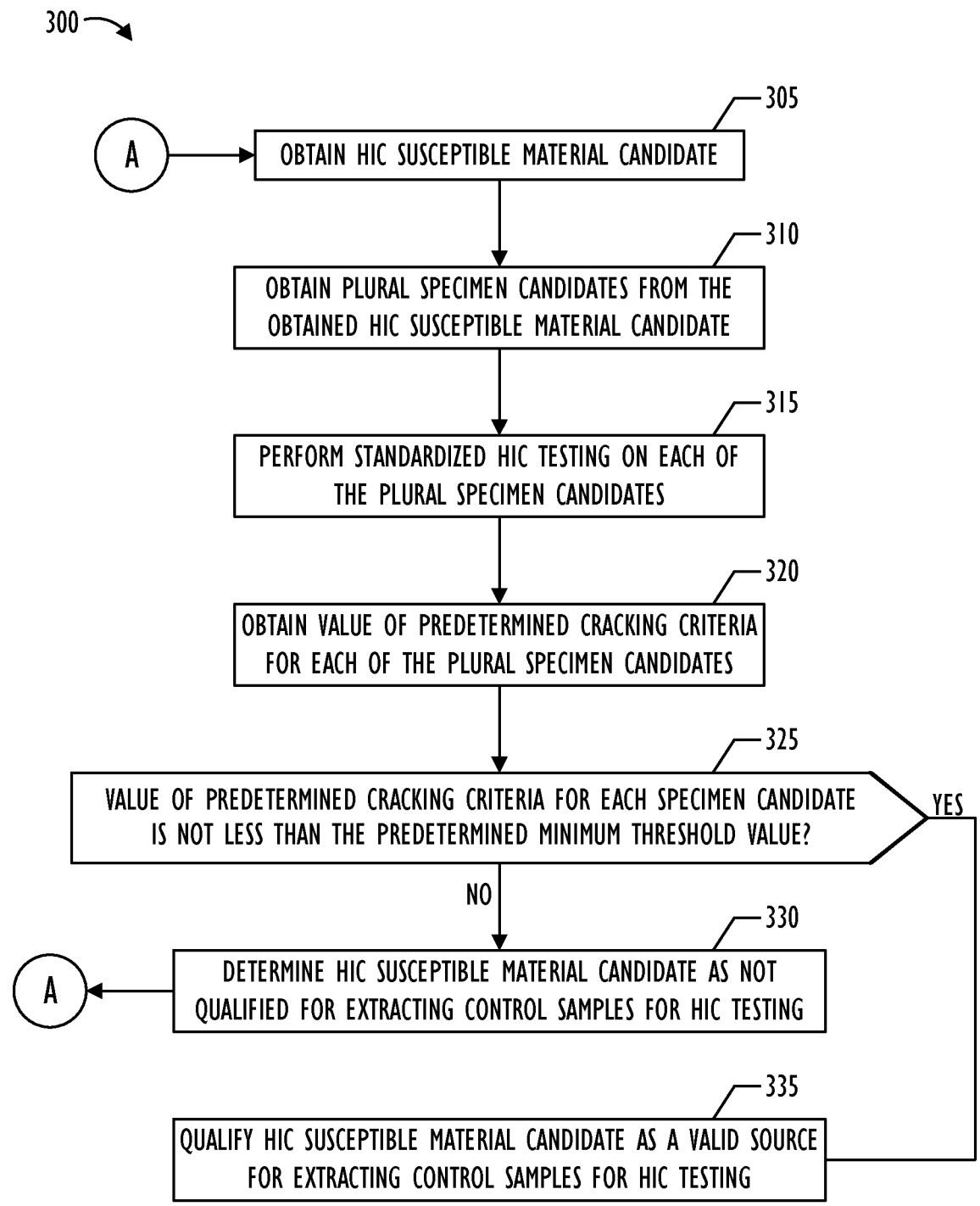
FIG. 3 is a flow chart that illustrates a method for developing and validating a HIC susceptible material candidate as a qualified source for obtaining control samples to be used in ensuring accuracy of HIC test results for test samples of HIC resistant materials, in accordance with one or more embodiments.
Figure 4:
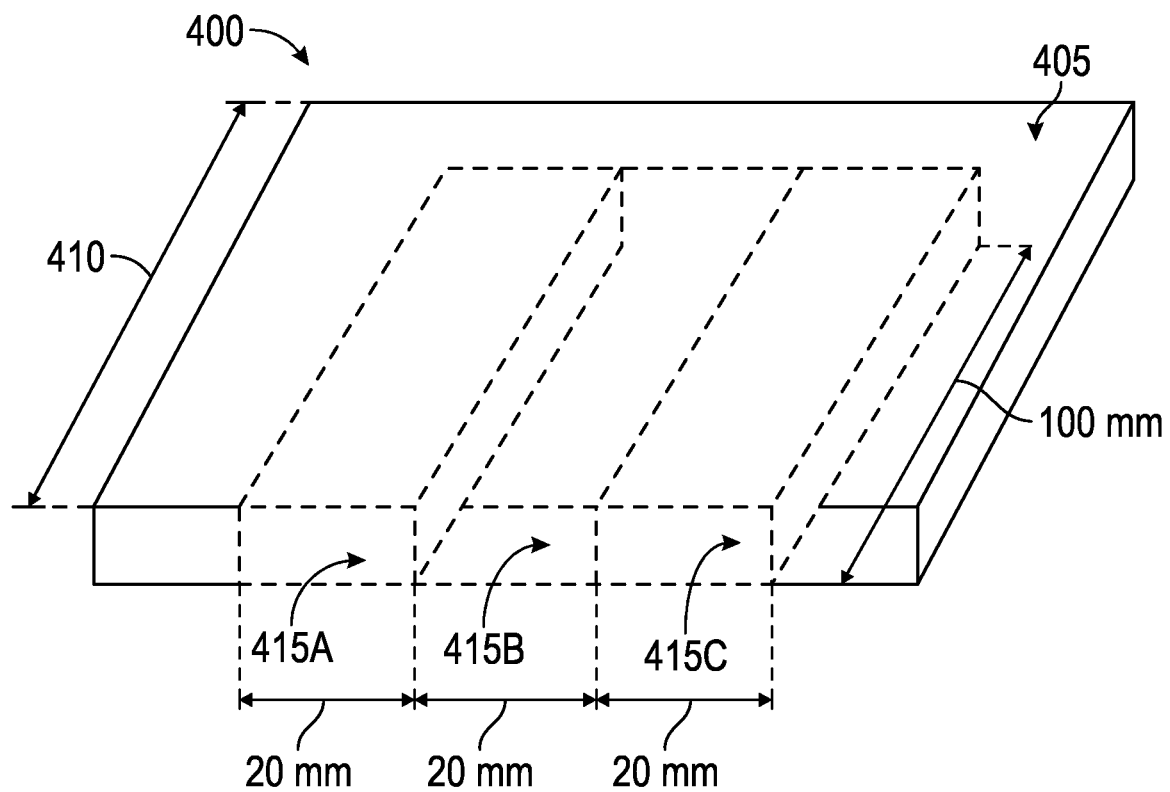
FIG. 4 is a schematic diagram showing the orientation of three specimens obtained from the HIC susceptible material candidate to determine whether the candidate is qualified as a source for obtaining control samples, in accordance with one or more embodiments.

In order to determine whether a particular alloy composition of HIC susceptible material candidate consistently meets or exceeds the identified minimum threshold value for the predetermined cracking criteria under standardized HIC testing conditions, Inventors of the present disclosure have developed a technique for preliminarily testing the HIC susceptible material candidates for HIC as shown in FIGS. 3 and 4.

FIG. 3 is a flow chart that illustrates method 300 for developing and validating a HIC susceptible material candidate as a qualified source for obtaining control samples to be used in ensuring accuracy of HIC test results for test samples of HIC resistant material candidates, in accordance with one or more embodiments. Method 300 begins at block 305 where a given HIC susceptible material candidate is obtained (e.g., developed, selected, manufactured, and the like). As explained previously, Inventors of the present disclosure have developed criteria for ideal HIC susceptible materials for obtaining control samples that will consistently produce the desired minimum threshold value for predetermined cracking criteria (e.g., CLR≥20% subsequent to HIC testing) under standardized testing conditions. For example, the HIC susceptible material candidate may be selected based on controlled chemical composition of certain elements including S, C, Mn, & Cu, where sulfur≥0.01%; carbon≥0.08% (and preferably, between 0.08% and 0.20%); manganese≥0.08%; and copper≤0.02%. The material candidate at block 305 is selected based on steel plate/coil manufacturing processes and chemical composition in order to ensure that the material is susceptible to HIC damage. The HIC susceptible material candidate obtained at block 305 may be a hot rolled coil or plate of manufactured steel alloy material having a specific Heat number (of a specific alloy composition of elements). Alternately, the HIC susceptible material candidate obtained at block 305 may be a base metal of welded pipe material (e.g., ERW pipes, LSAW pipes). When selecting a Heat number of plate or coil as a HIC susceptible material candidate at block 305, the chemical analysis of elements including C, Mn, S, and Cu is meticulously reviewed. Other supporting factors such as grade of materials, heat treatment, casting parameters of the steel are also considered in obtaining the HIC susceptible material candidate at block 305.

Method 300 then proceeds to block 310 where plural specimen or coupon candidates are obtained (e.g., extracted, cut, and the like) from the HIC susceptible material candidate of block 305. The technique of block 310 where plural specimen or coupon candidates are obtained is illustrated with reference to FIG. 4. FIG. 4 is a schematic diagram 400 showing the orientation, relative to principal rolling direction 410 of HIC susceptible material candidate 405 (e.g., hot rolled coil or plate principal rolling direction), of three specimens 415A, 415B, and 415C extracted from the HIC susceptible material candidate 405 to determine whether the candidate 405 can be qualified as a source for obtaining control samples, in accordance with one or more embodiments. As shown in FIG. 4, the particular developed or selected HIC susceptible material candidate 405 may be in the form of a hot rolled coil or plate of manufactured steel alloy material having a specific Heat number (of a specific alloy composition of elements). Alternately, the HIC susceptible material candidate 405 may be obtained from the base metal of welded pipe material. In either case, multiple specimens (e.g., three control sample candidates) 415A-C may be extracted or cut from the HIC susceptible material candidate 405. Each of the plural specimen candidates 415A-C is extracted from the same Heat number of the HIC susceptible material candidate 405 (and thus, has the same exact alloy composition). Although FIG. 4 illustrates extracting three specimen candidates 415A-C, this may not necessarily be the case. In other embodiments, and at block 310 of FIG. 3 (and in FIG. 4), fewer or greater number (e.g., two or four or more) of specimen candidates 415 may be extracted to perform the preliminary qualification testing for HIC susceptible material candidate 405. The thickness of coupons 415 may be the full thickness of the selected material 405. All six surfaces of each of the three specimens 415A, 415B, and 415C may be finished with grit paper (e.g., 320 grit paper) at block 310.

Returning to FIG. 3, after obtaining the candidate coupons at block 310 as explained above in connection with FIG. 4, method 300 proceeds to block 315 where standardized HIC testing is performed on the obtained (e.g., three) candidate coupons. For example, at block 315, HIC testing is performed as per Solution A of the NACE TM0284 standard, with a sodium chloride and acetic acid solution. Thus, at block 315, the candidate coupons (e.g., three specimens 415A-C of FIG. 4) obtained at block 310 are immersed in a sealed vessel containing 5% NaCl and 0.5% acetic acid in distilled water and purged with $H_2S$ gas resulting in a pH of 3. After 96 hrs of exposure to the corrosive test solution termed Solution A, each candidate coupon (e.g., each of the three specimens 415A-C of FIG. 4) is subject to metallographic sectioning (e.g., each of the three specimens 415A-C of FIG. 4 being metallographically sectioned for testing in a manner similar to that shown in FIG. 1) for evaluation and analysis. At block 315, the HIC testing for each of the specimen candidates may be performed one-at-a-time (e.g., HIC testing as per Solution A of the NACE TM0284 standard for 96 hours for specimen 415A of FIG. 4 and metallographic sectioning thereof; followed by HIC testing as per Solution A of the NACE TM0284 standard for 96 hours for specimen 415B of FIG. 4 and metallographic sectioning thereof; and followed by HIC testing as per Solution A of the NACE TM0284 standard for 96 hours for specimen 415C of FIG. 4 and metallographic sectioning thereof). Alternately, at block 315, the HIC testing for each of the specimen candidates may be performed simultaneously in the same HIC testing vessel or in different HIC testing vessels.

Method 300 then proceeds to block 320 where, for each of the plural specimen candidates, a value of the predetermined cracking criteria is determined (e.g., calculated, obtained) based on the HIC testing performed at block 315. For example, at block 320, CLR (and/or CTR, CSR) value for each of the specimen candidates may be calculated. Calculation of the CLR value for each of the plurality of specimen candidates at block 320 may be performed in the same manner as that for the sample in FIG. 1. For example, for each specimen candidate (e.g., each of the three specimens 415A-C of FIG. 4) at block 320, the value of the predetermined cracking criteria (e.g., CLR percentage value) may be calculated based on CLR values for one or more of the faces (e.g., 115A, 115B, and 115C in FIG. 1) of one or more of the pieces (e.g., 125A, 125B, 125C, and 125D in FIG. 1) of the specimen candidate.

At block 325, it is determined whether, for each of the specimen candidates, the value of the predetermined cracking criteria determined at block 320 is not less than a predetermined minimum threshold value. For example, at block 325, it may be determined whether the average CLR subsequent to HIC testing of each of the three (3) specimens 415A-C of FIG. 4 is at least 20%. As explained previously, the specified minimum threshold value of 20% for the control sample subsequent to HIC testing was developed based on repeated testing of control samples in HIC solutions by the Inventors of the present disclosure. The Inventors confirmed based on repeated testing and cracking analyses that for CLR less than 20% for the control sample, the HIC testing accuracy is dubious.

If it is determined that the value of the predetermined cracking criteria obtained at block 320 is not less than the predetermined minimum threshold value for each specimen candidate obtained at block 310 (YES at block 325), method proceeds to block 335 where it is determined that the HIC susceptible material candidate obtained at block 305 has been qualified as a valid source for extracting control samples for HIC testing. That is, at block 335, it is determined that the HIC susceptible material candidate obtained at block 305 adequately and consistently functions as a non-HIC resistant (or HIC susceptible) material based on predefined criteria for HIC susceptible materials under standardized testing conditions, and therefore, is qualified for use as a control sample during HIC testing of materials being evaluated for HIC resistance. At block 335, the Heat number of hot rolled coil or plate of the HIC susceptible material candidate obtained at block 305 may be qualified as a valid source for extracting control samples for HIC testing. For example, when all three candidate specimens 415A-C of FIG. 4 are determined to have developed at least 20% average CLR, HIC susceptible material candidate 405 (e.g., Heat number of HIC susceptible material candidate 405, base metal of welded pipe material) is considered to be qualified for use as control samples. The Heat number of HIC susceptible material may then be used for extracting multiple control samples that may each be used for ensuring accuracy of HIC testing for multiple HIC resistant material specimens.

On the other hand, if it is determined that the value of the predetermined cracking criteria obtained at block 320 is less than the predetermined minimum threshold value one or more of the specimen candidates obtained at block 310 (NO at block 325), method proceeds to block 330 where it is determined that the HIC susceptible material candidate obtained at block 305 is not qualified as a valid source for extracting control samples for HIC testing. That is, at block 330, it is determined that the HIC susceptible material candidate obtained at block 305 does not adequately and consistently produce predetermined cracking criteria (e.g., CLR≥20% for each of the plural specimen candidates) under standard testing conditions. Therefore, it is determined that the HIC susceptible material candidate obtained at block 305 is not suitable for use as a non-HIC resistant (or HIC susceptible) material, and therefore, is not qualified as a source for extracting control samples for use during HIC testing of materials being evaluated for HIC resistance.

At block 330, the Heat number of hot rolled coil or plate of the HIC susceptible material candidate obtained at block 305 may be disqualified for extracting control samples for HIC testing. For example, when at least one of the three candidate specimens 415A-C of FIG. 4 are determined to have developed less than 20% average CLR, the HIC susceptible material candidate 405 (e.g., Heat number of HIC susceptible material candidate 405, base metal of welded pipe material) is considered to be disqualified for use as control samples. Method 300 then returns to block 305 where a new HIC susceptible material candidate (having a new alloy composition) is selected and the steps of the method 300 are repeated for the new HIC susceptible material candidate to determine whether this new candidate is a valid source for extracting control samples. The new HIC susceptible material candidate at block 305 may be developed based on the above criteria developed by the Inventors of the present disclosure for ideal HIC susceptible materials for obtaining control samples that will consistently produce the desired minimum threshold value for predetermined cracking criteria (e.g., CLR≥20% subsequent to HIC testing). By repeating steps 305-335 of method 300, HIC susceptible materials candidates that consistently meet or exceed the desired minimum threshold value for predetermined cracking criteria (e.g., Inventive Examples 1-4 of Table 1 above) during standardized HIC testing can be identified and qualified for extracting control samples to be used in HIC testing of HIC resistant materials.

Once one or more qualified sources for extracting control samples are identified as per the techniques described above in connection with FIGS. 3 and 4, actual HIC testing can be performed on test samples of developed HIC resistant material candidates that are being tested and qualified for use in sour service applications, while using the coupons extracted from the qualified HIC susceptible materials as control samples. The extra step of using control samples in actual HIC testing will ensure that the results obtained from the standardized HIC testing for the test samples are accurate in predicting actual HIC performance of the HIC resistant material candidates for sour service use. Steps for developing and testing HIC resistant material candidates, and validating the test results for the candidates using qualified control samples are explained in detail below in connection with the flow chart of FIG. 5.

Figure 5:
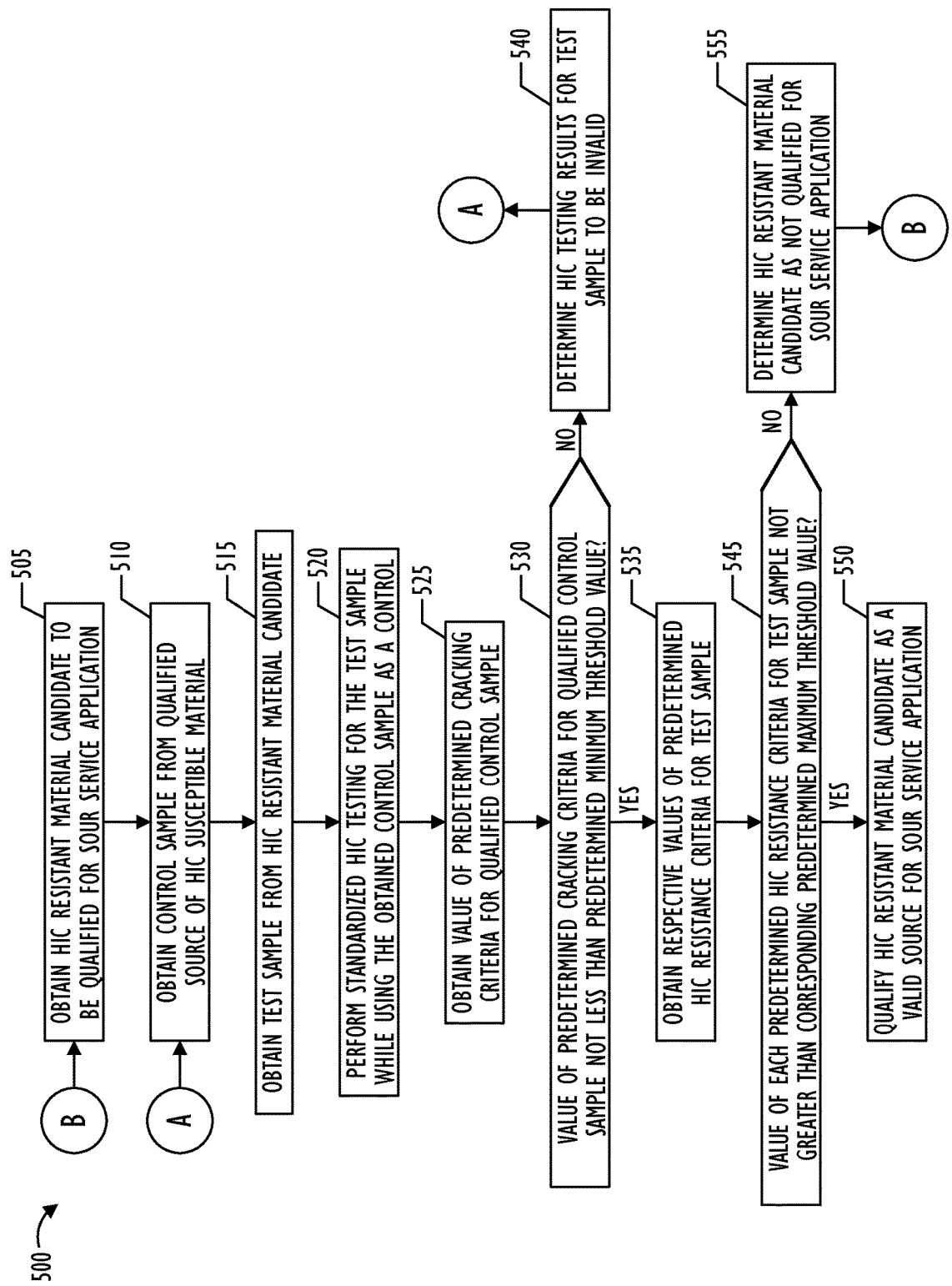
FIG. 5 is a flow chart that illustrates a method for performing standardized HIC testing for HIC resistant material candidates using a qualified control sample for accurately validating the HIC resistant material candidates for sour service applications, in accordance with one or more embodiments.

FIG. 5 is a flow chart that illustrates method 500 for performing an HIC test for an HIC resistant material candidate using a qualified control sample for accurately validating the HIC resistant material candidate for sour service applications, in accordance with one or more embodiments. Method 500 begins at block 505 where an HIC resistant material candidate, that is undergoing standardized testing for being qualified as adequately HIC resistant to be suitable for use in sour service applications, is obtained (e.g., selected, developed, manufactured, and the like). At block 505, the HIC resistant material candidate may be a manufactured hot rolled coil or plate having a specific heat number and a corresponding specific alloy composition. For example, the HIC resistant material candidate may be manufactured so that it is suitable for sour service use. Alternately, the HIC resistant material candidate may be a base metal of welded pipes.

Method 500 then proceeds at block 510 where a control sample is obtained (e.g., extracted, cut) from a qualified source of HIC susceptible material that has been qualified as described above in connection with FIGS. 3-4. For example, at block 510, one specimen or coupon (e.g., 100±1 mm long and 20±1 mm wide as shown in FIG. 1) may be extracted from a specific Heat number of HIC susceptible material that has been pre-qualified as a valid source for extracting control samples. As another example, at block 510, one specimen or coupon (e.g., 100±1 mm long and 20±1 mm wide as shown in FIG. 1) may be extracted from a base metal of welded pipe (HIC susceptible) material that has been pre-qualified as a valid source for extracting control samples.

At block 515, a test sample (e.g., specimen or coupon) is obtained (e.g., extracted, cut, and the like) from the HIC resistant material candidate obtained at block 505. The test sample at block 515 may be extracted from the HIC resistant material candidate in a manner shown in FIG. 1. For example, the test sample at block 515 may be a full thickness (≤30 mm) sample of 100±1 mm long and 20±1 mm wide that is cut from the Heat number of the HIC resistant material candidate obtained or selected at block 505 such that the longitudinal axis of the test sample is aligned with the principal rolling direction of the HIC resistant material candidate (FIG. 1).

At block 520, the test sample obtained at block 515 is subjected to standardized HIC testing while utilizing the qualified control sample obtained at block 510 as a control. That is, at block 520, the control sample obtained at block 510 and the test sample obtained at block 515 are subjected to standardized HIC testing simultaneously and under the same predetermined standardized conditions (e.g., test conditions dictated by NACE TM0284). In particular, at block 520, the qualified control sample may be placed in the same HIS testing vessel as the test sample of the HIC resistant material undergoing testing for HIC and subject to the same test conditions. For example, at block 520, the HIC testing is performed as per Solution A of the NACE TM0284 standard, with a sodium chloride and acetic acid solution. In this case, at block 520, the qualified control sample and the test sample are both immersed in the same sealed vessel containing 5% NaCl and 0.5% acetic acid in distilled water and purged with $H_2S$ gas resulting in a pH of 3. After 96 hrs of exposure to the corrosive test solution termed Solution A, both the qualified control sample and the test sample are subject to metallographic sectioning (e.g., each of the test sample and the qualified control sample may be metallographically sectioned for testing as shown in connection with FIG. 1) for evaluation and analysis.

Method 500 then proceeds to block 525 where a value (e.g., percentage value) of the predetermined cracking criteria for the qualified control sample is obtained (e.g., calculated, determined) based on the HIC testing performed on the control sample at block 520. The value of the predetermined cracking criteria for the qualified control sample may be calculated or obtained in a manner similar to the method of obtaining CLR, CTR, and CSR values for the sample 120 as shown in FIGS. 1 and 2. That is, for the qualified control sample subject to HIC testing at block 520 along with the test sample, metallographic evaluation may be performed for a plurality of pieces of qualified control sample (e.g., sample pieces 125A, 125B, 125C, and 125D of FIG. 1) after the HIC test for any cracks generated. That is, sectioned faces (e.g., faces at 115A, 115B and 115C in FIG. 1) of the qualified control sample may be examined and tested for cracks. For example, at block 525, a CLR (and/or CTR, CSR) value for the qualified control sample may be calculated as the value of the predetermined cracking criteria. The CLR value may be calculated by averaging CLR values calculated for one or more of the faces (e.g., 115A, 115B, and 115C in FIG. 1) of one or more of the pieces (e.g., 125A, 125B, 125C, and 125D in FIG. 1) of the qualified control sample subject to HIC testing at block 520. Thus, after completion of HIC testing, the control specimen and the test specimen will be examined by metallographic sectioning as per NACE TM0284. CLR will be measured for the control sample. As per NACE TM0284, for the test sample, CLR, CTR and CSR will be calculated for each metallographic section.

Method 500 then proceeds to block 530 where it is determined whether the calculated value of the predetermined cracking criteria for the qualified control sample is not less than the predetermined minimum threshold value. For example, at block 530, it may be determined whether the average CLR subsequent to HIC testing for the qualified control sample is at least 20%. If it is determined that the value of the predetermined cracking criteria obtained at block 525 is at least the predetermined minimum threshold value for the qualified control sample (YES at block 530), method 500 proceeds to block 535 where respective values of each predetermined HIC resistance criteria for the test sample are obtained. As discussed previously, the qualified control sample is expected to generate predetermined HIC damage (e.g., CLR≥20% subsequent to HIC testing; value of the predetermined cracking criteria greater than predetermined minimum threshold value) when subject to standardized HIC testing conditions (e.g., NACE TM0284, Solution A). Thus, if, at block 520, the HIC test was in fact carried out accurately in accordance with the test conditions dictated by, e.g., the NACE TM0284 standard, Solution A, then the qualified control sample (that is known to generate predetermined HIC damage under standardized test conditions of) will produce predetermined HIC damage (e.g., CLR≥20% subsequent to HIC testing). Therefore, at block 530, existence of the predetermined HIC damage for the qualified control sample indicates that the HIC test for the test sample (that is placed in the same HIC testing vessel as the qualified control sample) has been carried out under accurate HIC testing conditions as dictated by, e.g., the NACE TM0284 standard, Solution A. Once accuracy of the testing conditions has been validated and verified at block 530, operation can proceed to block 535 to determine whether the HIC resistant material candidate obtained at block 505 can be validated for sour service applications based on HIC performance as measured from the HIC test results for the test sample.

On the other hand, if it is determined that the value of the predetermined cracking criteria obtained at block 525 is less than the predetermined minimum threshold value for the qualified control sample (NO at block 530), method 500 proceeds to block 540 where the HIC testing results of the HIC testing for the test sample performed at block 520 are determined to be invalid. At block 530, absence of the predetermined HIC damage for the qualified control sample indicates that the HIC test for the test sample (that is placed in the same HIC testing vessel as the qualified control sample) has not been carried out under accurate HIC testing conditions as dictated by, e.g., the NACE TM0284 standard, Solution A. For example, the HIC testing at block 520 may have used an incorrect test solution preparation or an incorrect pH measurement (or other inconsistencies that constitute a departure from the test conditions dictated by the NACE TM0284 standard). Such inaccuracies in the testing conditions can have a major detrimental effect on the test results conducted in $H_2S$ containing solutions, and render the results to be inaccurate. Thus, at block 530, by using a qualified control sample that is known to consistently produce predetermined HIC damage in predefined standardized HIC testing environments, accuracy of the test result for the test sample extracted from the HIC resistant material candidate can be ensured. Once the HIC testing results of the HIC testing for the test sample performed at block 520 are determined to be invalid at block 540, method 500 returns to block 510 and steps 510-550 of method 500 are repeated to perform the HIC test again for the HIC resistant material candidate obtained at block 505. For example, a new qualified control sample may be extracted at block 510, a new test sample from the same Heat number of the HIC resistant material candidate currently under test may be extracted at block 515, the HIC test under NACE TM0284 standard, Solution A or B may be performed again for the newly obtained control and test samples at block 520, and subsequent steps of method 500 may be repeated to obtain accurate HIC test results under accurate HIC testing conditions for the test sample of the HIC resistant material candidate obtained at block 505.

At block 535, respective values (e.g., percentage values) of each predetermined HIC resistance criteria for the test sample are obtained (e.g., calculated, determined) based on the HIC testing performed on the test sample at block 520. The value for each of the predetermined HIC resistance criteria for the test sample may be calculated or obtained in a manner similar to the method of obtaining CLR, CTR, and CSR percentage values for the sample 120 as shown in FIGS. 1 and 2. That is, for the test sample subject to HIC testing at block 520, metallographic evaluation may be performed for a plurality of pieces of test sample (e.g., sample pieces 125A, 125B, 125C, and 125D of FIG. 1) after the HIC test for any cracks generated. That is, sectioned faces (e.g., faces at 115A, 115B and 115C in FIG. 1) of the test sample may be examined and tested for cracks. For example, at block 535, CLR, CTR, and CSR values for the test sample may be calculated as the respective values for the predetermined HIC resistance criteria. In some embodiments, each of CLR, CTR, and CSR values may be calculated by respectively averaging the CLR, CTR, and CSR values calculated for one or more of the faces (e.g., 115A, 115B, and 115C in FIG. 1) of one or more of the pieces (e.g., 125A, 125B, 125C, and 125D in FIG. 1) of test sample subject to HIC testing at block 520.

Method 500 then proceeds to block 545 where it is determined whether the calculated values of the predetermined HIC resistance criteria for the test sample are not greater than corresponding predetermined maximum threshold values (e.g., percentage values). The maximum threshold values for the predetermined HIC resistance criteria (e.g., CSR, CTR, CLR) are predetermined based on the level of HIC resistance required of the HIC resistant material being tested. For example, the maximum threshold values for CLR, CTR and CSR may be preset at 15%, 5% and 2%, respectively, based on API and International standards for HIC resistant linepipe grades. In this case, at block 545, it may be determined whether, for the test sample subjected to HIC testing at block 520, the average CSR≤2%, average CLR≤15%, and average CTR≤5%. As another example, the maximum threshold values for CLR, CTR and CSR may all be preset at 0%, to have the HIC resistant material candidate meet more stringent requirements for resistance to HIC. In this case, at block 545, it may be determined whether, for the test sample subjected to HIC testing at block 520, the average CSR, average CLR, and average CTR are all=0%.

If it is determined that the calculated values for the predetermined HIC resistance criteria for the test sample are not greater than corresponding predetermined maximum threshold values (YES at block 545), method 500 proceeds to block 550 where the corresponding manufactured HIC resistant material candidate obtained at block 505 is qualified as a valid source of material for use in sour service applications. That is, at block 550, it is determined that the HIC resistant material candidate obtained at block 505 meets the predetermined requirements for HIC resistance that are needed for using the material in sour service applications, and therefore, the HIC resistant material candidate obtained at block 505 (from which the test sample is extracted at block 515) is determined to be an acceptable source for obtaining HIC resistant material. For example, for the test sample, when the average CSR≤2%, average CLR≤15%, and average CTR≤5%, the HIC resistant material candidate (e.g., Heat number of HIC resistant material candidate) is considered to be qualified for use in wet-sour environments.

The source of the HIC resistant material candidate obtained at block 505 may be any suitable source. For example, the source may be any type of carbon steel material made from coils or plates, which needs to be tested for HIC resistance adequacy to avoid failures in wet sour applications. At block 550, this source of the HIC resistant material candidate obtained at block 505 is now considered to be qualified as a valid source for use in sour service applications. For example, if the source is a particular selected or manufactured Heat number of hot rolled coil or plate, then the Heat number of the HIC resistant material candidate obtained at block 505 may be qualified as a valid source for use in sour service applications. As another example, if the source is a base metal of a welded pipe (e.g., ERW API 5 L X60 pipe) and the test sample at block 515 is a specimen or coupon obtained from the base metal of the welded pipe, then, at block 550, the ERW API 5 L X60 pipe is now considered valid for use in sour service applications.

On the other hand, if it is determined that at least one of the calculated values for the predetermined HIC resistance criteria for the test sample is greater than a corresponding predetermined maximum threshold value (NO at block 545), method 500 proceeds to block 555 where the HIC resistant material candidate obtained at block 505 is determined to be not qualified for use in sour service applications. At block 545, HIC damage greater than the threshold amounts (as indicated by at least one of the calculated values for the predetermined HIC resistance criteria for the test sample being greater than a corresponding predetermined maximum threshold value) indicates that the HIC resistant material candidate from which the test sample was extracted is not fit for use in sour service applications that require high levels of HIC resistance. Using such low- or non-HIC resistant material candidate for manufacturing equipment like pipelines, plates, coils, flanges, vessels, and fittings for extraction, treatment, transportation and storage of crude containing water and $H_2S$ (e.g., wet sour service applications) would lead to cracking and breakage that would reduce the lifetime of the equipment, and cause leakage or catastrophic damage. By disqualifying such HIC resistant material candidate at block 555 (e.g., disqualifying the Heat number of the HIC resistant material candidate, or other source identifier of the HIC resistant material candidate) use of such material for wet sour service applications is prevented. Once the HIC resistant material candidate obtained at block 505 is determined to be invalid or not qualified for sour service use at block 555, method 500 returns back to block 505 and the steps of method 500 are repeated to perform the HIC test again for a new HIC resistant material candidate. For example, steps of the method 500 may be repeated, a new HIC resistant material candidate (e.g., having a new Heat number or a new source identifier) may be obtained, a new qualified control sample extracted, a new test sample from the new Heat number of the new HIC resistant material candidate may be extracted, and the HIC test under NACE TM0284 standard, Solution A or B may be performed again as per method 500 for the newly obtained control sample and the new test sample of the new HIC resistant material candidate.

By repeating the steps of method 500, HIC resistant material candidates that meet or exceed the desired level of HIC resistance during standardized HIC testing can be identified and qualified for use in sour service applications, and further, the level of confidence of the identified and qualified HIC resistant material candidates actually possessing adequate levels of HIC resistance is increased by using qualified control samples extracted from HIC susceptible materials.

Experiment

Inventors of the present disclosure have conducted experiments to determine whether a steel plate with wall thickness of 19 mm (e.g., HIC susceptible material candidate) was qualified to obtain or extract control samples for HIC testing of test samples. The chemical analysis for the plate was conducted. The results of chemical analysis are: C: 0.6%, Si: 0.18%, Mn: 0.86%, P: 0.09%, S: 0.017%, Cr: 0.01%, Mo: <0.01%, Ni: 0.01%, Al: 0.05%, B: <0.0005%, Cu: 0.01%, Nb: <0.01%, Ti: <0.01%, V: <0.01%, Ca: <0.02%, and N: 0.008%. Three specimens (e.g., control sample candidates) were extracted from the plate as shown in FIG. 4. The specimens were subjected to ultrasonic test to ensure that there are no pre-existing cracks. HIC test was conducted as per the NACE TM0248 standard (Solution A) for 96 hours. 99.5% purity $H_2S$ gas was used in the HIC testing. The Initial pH was 2.6 and after testing, the pH was 3.5. The average CLR (e.g., calculated value of predetermined cracking criteria) for the three specimens were 43%, 35%, and 50%. Based on the results, the Inventors determined that the steel plate with wall thickness of 19 mm (e.g., HIC susceptible material candidate) was qualified to extract control samples for HIC test.

Figure 6:
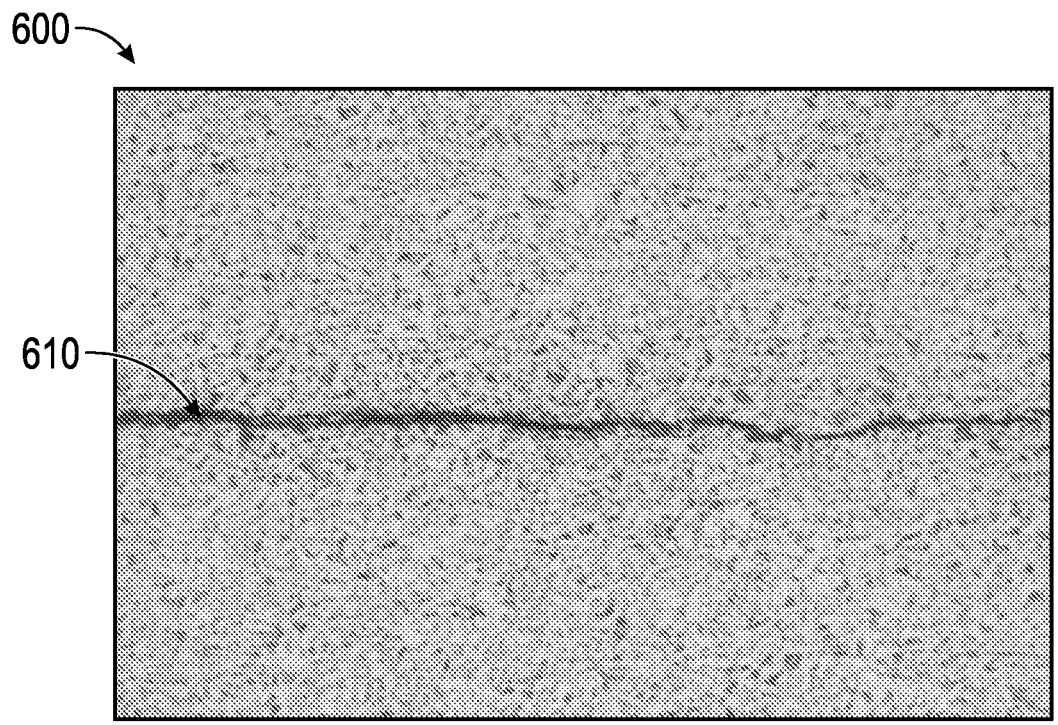
FIG. 6 is a photomicrograph showing the microstructures indicating HIC failure of the qualified control sample subsequent to HIC testing for a test samples of an HIC resistant material candidate, in accordance with one or more embodiments.

After qualification of the material, a specimen (e.g., qualified control sample) was extracted from the qualified plate and placed with ERW API 5 L X60 pipe specimens (e.g., test sample extracted from HIC resistant material candidate) intended to be qualified for sour service application. After the HIC test, CLR was calculated for both the control sample and the test sample. While the average CLR of the qualified control sample was 32% (610 in photomicrograph 600 of FIG. 6; value of predetermined cracking criteria for qualified control sample is at least equal to predetermined minimum threshold value of 20%), the average CLR, CTR, CSR of the examined API 5 L X60 60 (test sample) specimen were 0% (value of each predetermined HIC resistance criteria for test sample not greater than corresponding predetermined maximum threshold value of 0%). Thus, in this case, the HIC test results for the ERW API 5 L X60 pipe specimens were considered to be valid (because CLR of the control sample was 32%), and the ERW API 5 L X60 pipe was considered to have passed the HIC test (because average CLR, CTR, CSR of the examined API 5 L X60 60 specimens were 0%), and considered acceptable for use in critical sour service applications.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (e.g., meaning having the potential to), rather than the mandatory sense (e.g., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the subject matter of the present disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for performing a standardized hydrogen induced cracking (HIC) test on a HIC resistant material for a sour service application, the method comprising: obtaining the HIC resistant material candidate; extracting a test sample from the HIC resistant material candidate; extracting a control sample from a prequalified HIC susceptible material, the prequalified susceptible material being known to suffer predetermined HIC damage when subjected to preset test conditions of a standardized HIC test; performing the standardized HIC test on the test sample and the control sample; calculating a value of a predetermined cracking criteria for the control sample subsequent to the standardized HIC test; determining whether the calculated value of the predetermined cracking criteria for the control sample is at least equal to a predetermined minimum threshold value; calculating respective values of a plurality of predetermined HIC resistance criteria for the test sample subsequent to the standardized HIC test, in response to determining that the calculated value of the predetermined cracking criteria for the control sample is at least equal to the predetermined minimum threshold value; determining whether the calculated respective values of the plurality of predetermined HIC resistance criteria for the test sample are not greater than corresponding predetermined maximum threshold values; and qualifying the HIC resistant material candidate as a valid source for sour service applications in response to determining that the calculated respective values of the plurality of predetermined HIC resistance criteria for the test sample are not greater than the corresponding predetermined maximum threshold values.

2. The method according to claim 1, wherein performing the standardized HIC test on the test sample and the control sample comprises placing the test sample and the control sample in the same HIC testing vessel to subject the test sample and the control sample to the preset test conditions of the standardized HIC test.

3. The method according to claim 2, wherein the standardized HIC test is a standardized NACE TM0284 corrosion test, and wherein the test sample and the control sample are immersed in a corrosive test Solution A or a corrosive test Solution B, as defined by the NACE TM0284 corrosion test.

4. The method according to claim 2, wherein the HIC resistant material candidate is one of a hot rolled coil or plate of a carbon steel alloy composition having a particular Heat number, and a base metal of a welded pipe.

5. The method according to claim 4, wherein: the test sample is extracted from the HIC resistant material candidate such that a longitudinal direction of the test sample is aligned with a principal rolling direction of the HIC resistant material candidate, and the control sample is extracted from the prequalified HIC susceptible material such that a longitudinal direction of the control sample is aligned with a principal rolling direction of the prequalified HIC susceptible material.

6. The method according to claim 5, further comprising: metallographically sectioning the control sample into a plurality of pieces subsequent to the standardized HIC test; analyzing one or more faces of one or more of the plurality of pieces of the control sample to calculate a Crack Length Ratio (CLR), wherein the calculated CLR is the value of the predetermined cracking criteria for the control sample calculated subsequent to the standardized HIC test; metallographically sectioning the test sample into a plurality of pieces subsequent to the standardized HIC test; and analyzing one or more faces of one or more of the plurality of pieces of the test sample to calculate a CLR, a Crack Sensitivity Ratio (CSR), and a Crack Thickness Ratio (CTR), wherein the calculated CLR, CSR, and CTR are the respective values of the plurality of predetermined HIC resistance criteria for the test sample calculated subsequent to the standardized HIC test.

7. The method according to claim 6, wherein the predetermined minimum threshold value for the CLR of the control sample is preset at 20%, and wherein the predetermined maximum threshold values for the CLR, CSR, and CTR for the test sample are preset at 15%, 2%, and 5%, respectively, and wherein the HIC resistant material candidate is qualified as the valid source for sour service applications in response to determining subsequent to the standardized HIC test that the calculated CLR for the control sample is at least 20%, while the calculated respective values of the CLR, CSR, and CTR for the test sample are not greater than 15%, 2%, and 5%, respectively.

8. The method according to claim 6, wherein the predetermined minimum threshold value for the CLR of the control sample is preset at 20%, and wherein the predetermined maximum threshold values for the CLR, CSR, and CTR for the test sample are all preset at 0%, and wherein the HIC resistant material candidate is qualified as the valid source for sour service applications in response to determining subsequent to the standardized HIC test that the calculated CLR for the control sample is at least 20%, while the calculated respective values of the CLR, CSR, and CTR for the test sample are all 0%.

9. The method according to claim 1, wherein qualifying the HIC resistant material candidate as the valid source for sour service applications comprises qualifying a Heat number corresponding to the HIC resistant material candidate as the valid source for sour service applications.

10. The method according to claim 1, further comprising, in response to determining that the calculated value of the predetermined cracking criteria for the control sample is less than the predetermined minimum threshold value: determining that results of the standardized HIC test on the test sample are invalid; obtaining a new test sample from the HIC resistant material candidate; obtaining a new control sample from the prequalified HIC susceptible material; and performing a new standardized HIC test on the new test sample and the new control sample.

11. The method according to claim 1, further comprising: determining a Heat number corresponding to the HIC resistant material candidate as an invalid source for sour service applications in response to determining that the calculated respective value of at least one the plurality of predetermined HIC resistance criteria for the test sample is more than the corresponding predetermined maximum threshold value.

12. The method according to claim 1, wherein extracting the control sample from the prequalified HIC susceptible material comprises cutting the control sample having predefined dimensions from a Heat number corresponding to the prequalified HIC susceptible material.

13. A control sample for verifying accuracy of test conditions during a standardized NACE TM0284 corrosion test on a test sample being qualified for use in sour service applications, wherein the control sample is extracted from a steel alloy composition including, in weight percent: Sulfur>0.01%, Carbon 0.08%-0.20%, Manganese>0.08%, and Copper<0.02%, wherein the control sample is configured to be placed in the same hydrogen induced cracking (HIC) testing vessel as the test sample of an HIC resistant material candidate undergoing the standardized NACE TM0284 corrosion test for qualifying the HIC resistant material candidate as a valid source for use in sour service applications, and wherein the control sample produces a Crack Length Ratio (CLR) of at least 20% when immersed in a corrosive test Solution A or a corrosive test Solution B of the standardized NACE TM0284 corrosion test, and when the control sample and the test sample are subject to the standardized test conditions as defined by the standardized NACE TM0284 corrosion test.

* * * * *